Aug. 8, 1950            T F. HART            2,517,661
THERMAL SHAPING OF CORUNDUM AND SPINEL CRYSTALS
Filed March 1, 1946            2 Sheets-Sheet 2
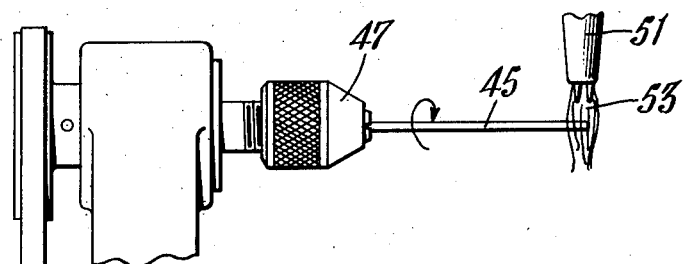
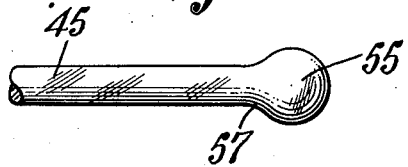
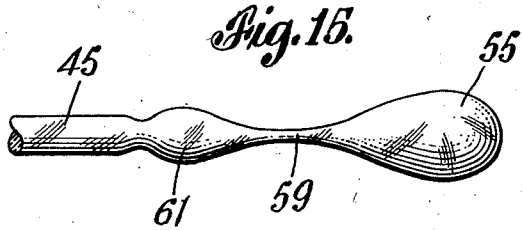
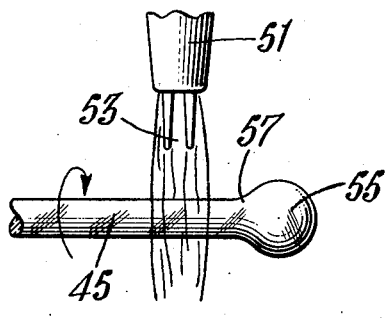
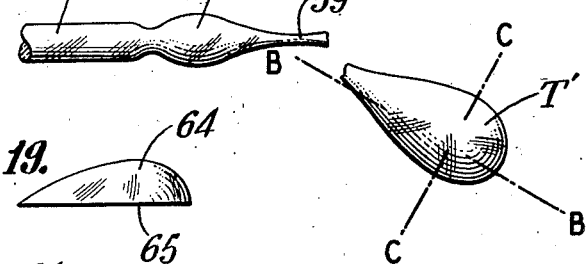
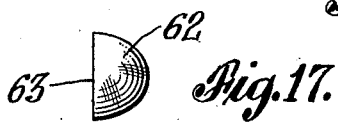
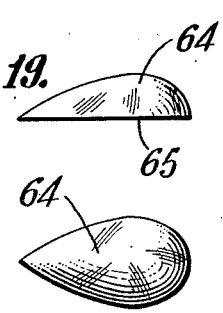
INVENTOR
THOMAS F. HART
BY
ATTORNEY Patented Aug. 8, 1950

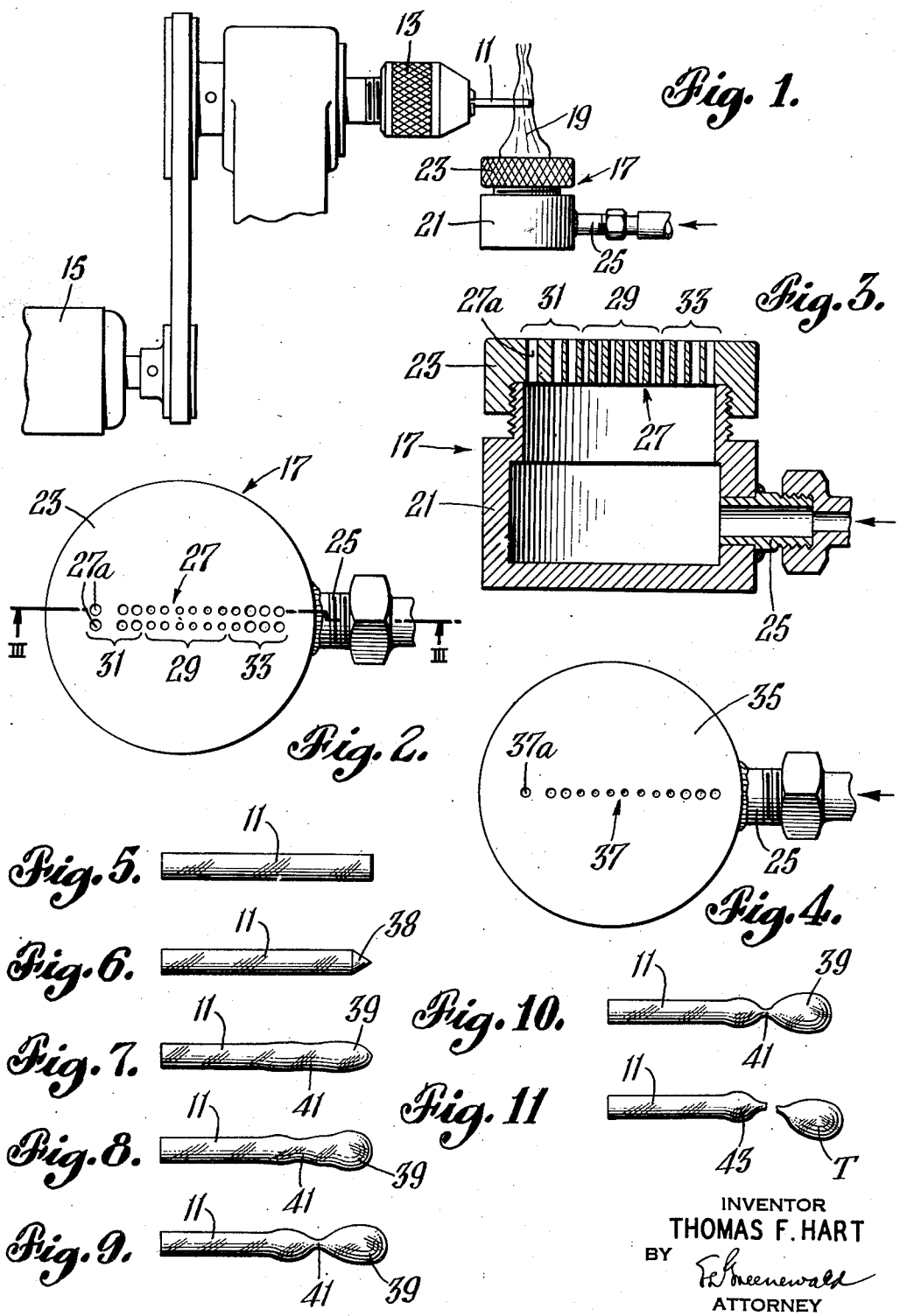

2,517,661

UNITED STATES PATENT OFFICE 2,517,661

THERMAL SHAPING OF CORUNDUM AND SPINEL CRYSTALS

Thomas F. Hart, Kenmore, N. Y., assignor to The Linde Air Products Company, a corporation of Ohio Application March 1, 1946, Serial No. 651,135

12 Claims. (Cl. 49—84)

This invention relates to a method for forming small rounded bodies from crystalline corundum and spinel rods, and especially to the formation of small gems such as sapphire, ruby and spinel cabochons, pendants, and teardrops.

It has long been customary to shape spinel crystals and crystals of corundum, such as ruby and sapphire, by mechanically cutting, grinding, and polishing them with abrasives such as diamond powder. Such mechanical operations are expensive, slow, and laborious, and leave minute scratches on the surfaces of the crystals.

The principal object of the present invention is to provide a novel method for forming small rounded corundum and spinel bodies such as cabochons, pendants, and teardrops, which overcomes the disadvantages of mechanical abrading operations. Other objects are to provide a thermal method for producing such rounded bodies; a method wherein a small rounded body can be both formed and severed from a corundum or spinel rod thermally; and a method whereby a plurality of small rounded bodies can be successively formed and severed from a single crystalline corundum or spinel rod.

The above and other objects, and the novel features of the invention, will become apparent from the following description, having reference to the accompanying drawings, wherein:

Fig. 1 is a schematic elevational view showing apparatus for performing the preferred embodiment of the novel thermal method of the invention;

Fig. 2 is an enlarged plan view of the burner head shown in Fig. 1;

Fig. 3 is a sectional view taken along the line III—III in Fig. 2;

Fig. 4 is a plan view of a modified form of burner head;

Figs 5 to 11, inclusive, are enlarged side elevational views showing successive stages in the formation of a small rounded body by the preferred embodiment of the novel thermal method;

Fig. 12 is a schematic elevational view showing apparatus for forming a rounded shape on a crystalline corundum or spinel rod by a second embodiment of the novel thermal method;

Figs 13 to 16, inclusive, are enlarged side elevational views showing successive stages in the manufacture of a corundum or spinel teardrop from a crystalline corundum or spinel rod by the second embodiment of the novel method;

Figs. 17 and 18 are side and front elevational views, respectively, showing a cabochon gem formed from the teardrop of Fig. 16; and Figs. 19 and 20 are side and front elevational views, respectively, showing a pendant gem formed from the teardrop of Fig. 16.

The invention involves forming a bulb on the end of a thin solid unicrystalline corundum or spinel rod by applying to an end portion thereof an intensely hot heating medium, such as an oxy-natural gas or oxy-hydrogen flame, having sufficient heating intensity to heat the material at least superficially to its melting point, which for sapphire (alumina) is about 2050° C. and for magnesia-alumina spinel is about 2135° C. Surface tension causes the melted material to assume a generally spherical shape. The bulb is then severed from the main body of the rod at a locality adjacent the base of the bulb, and the shaping and severing operations are repeated on the newly exposed end of the rod. It is advantageous to perform the severing at least partially by applying to a selected circumferential zone on the rod a heating medium of sufficient heating intensity to melt the corundum or spinel, and displacing the melted material from the zone by the combined effects of surface tension and erosion with a hot high velocity gas stream. When a flame such as an oxy-natural gas flame is employed for the severing operation, the burning gases of the flame act both to melt and displace the material from the zone of severance. The resulting small rounded teardrop shaped body tapers gradually from its rounded end to a somewhat pointed base and can be further processed to form a cabochon having a substantially flat base by abrading off the pointed base; or to form a pendant by abrading material from the teardrop in a lengthwise direction.

In the preferred embodiment of the method, illustrated in Figs. 1 to 11, inclusive, a crystalline corundum, or spinel rod 11 is mounted horizontally at one end in a chuck 13 rotated by an electric motor 15. While the rod 11 is rotated on its longitudinal axis by the motor, a burner 17 is held adjacent to the free end of the rod in such a position that a thin ribbon or sheet-like flame 19 elongated lengthwise of the rod impinges normally against a lengthwise extending circumferential zone sufficiently to melt a layer including the surface. Flame 19 is of such a character that the portions of rod at both ends of the zone are heated more rapidly and to a greater depth than at the middle of the zone, to form a bulb on the end of the rod and an adjoining thin neck of smaller diameter than the bulb and the rod connecting the bulb to the remainder of the rod, both in one continuous operation.

Referring to Figs. 2 and 3, one suitable type of burner 17 comprises a hollow body 21 having a perforated cap 23 threaded over its open end. A combustible gas, such as an oxy-natural gas or oxy-hydrogen mixture, is supplied to body 21 by an inlet 25 connected to a suitable source of supply (not shown) and flows out through a row of perforations or ports in cap 23 to produce, when ignited, a plurality of flame jets which merge to form a thin ribbon or sheet-like flame elongated in a direction transversely of the individual flame jets and extending the length of the row.

Proper heat distribution in the ribbon flame 19 and in the heated zone of the rod is obtained by arranging the gas discharge ports quite close together in a long, narrow, straight double row 27 consisting of two parallel lines of ports; and by making the ports of such size that the ports in the middle part 29 of the row are of relatively small size to provide flame jets of relatively small size and heating intensity, and the ports in the two end parts 31 and 33 of the row on both sides of the middle part 29 are of relatively larger size to provide flame jets of relatively larger size and heating intensity. For example, the middle part 29 may comprise ports of #65 drill size (Manufacturers' Standard) and the end parts 31 and 33 may comprise larger ports of #55 drill size. Of course all ports in each part of the row need not be of exactly the same size, but may be varied in size to some extent to influence the shape of the bulb and adjoining neck produced during the flame forming operation. Also, the bulb and neck shape can be influenced by varying the spacing between the several ports.

In an alternative type of burner head 35 shown in Fig. 4, the gas discharge ports are arranged in a long, narrow, straight single row 37 to produce a somewhat narrower ribbon flame.

In both burners 17 and 35 the end ports 27a and 37a, which are arranged farthest from the end of the rod 11, are spaced from their neighbors by a greater distance than is between any of the other ports because such spacing has been found to aid in producing the proper shape of the bulb and to expedite the formation of a thin neck.

Fig. 5 shows a straight approximately cylindrical rod 11 of ruby, having a diameter of 0.130 inch, for example, which has been selected for the flame forming operation. First, as in Fig. 6, one end of rod 11 is tapered in any suitable way, as by grinding to a cone 38 (or frustum of a cone), advantageously having an included angle of about 45°. The end of the rod 11 can be flame shaped without first tapering the end, but a more desirable shape is obtained with the tapered rod. Then the tapered rod 11 is mounted as in Fig. 1 and the flame forming process is carried out as previously described herein, by positioning the burner 17 about 1.125 inches from the rod with the row 27 of ports parallel to the rod. Figs. 7 to 10, inclusive, show the shapes obtained at 20 second intervals, the bulb being indicated at 39 and the adjoining neck at 41.

When the desired shape of the bulb 39 is obtained as in Fig. 10, the ribbon flame 19 is removed slowly radially or laterally from its heating position. The bulb 39 may then be severed from the remainder of the rod 11 at the neck 41 in any suitable way, as by mechanically cutting or breaking the neck portion, or by severing the neck with a flame. Some types of ornamental jewelry, however, may require that the rod 11 be cut at some point on the side of the neck 41 remote from bulb 39.

When severed at the neck 41, a generally pear shaped or tear drop shaped body T of the type shown in Fig. 11 is obtained. The remainder of the rod 11 now has a flame-formed cone 43 on its free end left from the flame shaping operation, and the next teardrop can thus be formed on the rod without first grinding the end to a taper. The forming and severing operations can be repeated on successive end portions of the rod to form a plurality of teardrops without removing the rod from the chuck 13.

In another embodiment of the method, illustrated in Figs. 12 to 16 inclusive, a crystalline ruby, sapphire, or spinel rod 45, with or without a tapered end, is mounted horizontally at one end in a chuck 47 rotated by an electric motor 49. While the rod 45 rotates on its longitudinal axis, a burner nozzle 51 is held adjacent to the end of the rod in such a position that a flame 53 impinges against a circumferential end portion of the rod, desirably substantially normally thereto. It is advantageous to use a multi-jet flame but a single jet flame will operate satisfactorily. As shown in Fig. 13 a generally spherical bulb 55 of considerably greater diameter than the rod itself forms by the action of surface tension on material melted by the flame. An operator can control the size of the bulb by regulating the heating intensity of the flame and the duration of the heating period.

After formation of the bulb 55, and while the rod is still rotating with the chuck 47, the same high temperature flame 53 is shifted longitudinally until it impinges transversely, and desirably radially, against a circumferential zone on the portion of the rod adjacent to but spaced slightly away from the base 57 of the bulb. During rotation of the rod the flame melts successive portions of its surface and the molten portions, under the influence of surface tension and the dynamic erosive action of the hot gases in the flame, are displaced longitudinally of the rod in both directions from the zone of impingement of the flame to form a neck or constriction 59. As illustrated in Fig. 15, the portion of molten corundum which flowed away from the bulb 55 has formed a second smaller bulb 61 on the main body of the rod, and the portion which flowed toward the bulb 55 has been incorporated therewith to produce a pear shape or teardrop form.

Ordinarily, the thermal constricting step is continued until the pear shaped bulb 55 is completely severed from the main body of the rod by the flame, as shown in Fig. 16. However, severance also can be accomplished by thermally constricting the rod to a small diameter, as shown in Fig. 15, and then completing the severing operation by forcibly breaking or cutting the neck. In the latter procedure, the thermally shaped rod of Fig. 15 may be regarded as a blank upon which the finishing operations can be performed. The rod 45 also may be severed on the side of the neck 59 remote from the bulb 55 to be used in this condition in ornamental jewelry.

After severance of the pear shaped bulb 55, the remainder of the rod 45 is left with the second small bulb 61 which tapers to the end of the rod. The flame is then applied to the second small bulb 61 on the newly exposed end of the rotating rod to increase its size, and the resulting larger bulb can be severed as described above. The shaping and severing operations can be repeated on successive end portions of the rod as long as there is sufficient stock for mounting in chuck 47.

The teardrop or pear shaped body T' shown in

Fig. 16, which is the product of the method described above, is symmetrical about its longitudinal axis and has a smooth, clear, scratch-free, and glossy surface extremely pleasing in appearance. Such bodies can be used as attractive gems in ornamental jewelry.

When a cabochon shape is desired, the teardrop or pear shaped body T'' of Fig. 16, or T of Fig. 11 is treated by abrasively cutting or grinding off the relatively pointed base portion until the desired shape is obtained, as by grinding to the plane defined by the line C—C and a normal to the longitudinal axis of the teardrop. Figs. 17 and 18 show a cabochon formed by this method having a smooth, glossy, scratch-free, clear symmetrical convex surface 62 and a plane abraded base 63.

When a pendant is desired, the teardrop T'' or T is treated by abrasively cutting it in a lengthwise direction and then grinding the plane cut surface until the desired shape is obtained. Figs. 19 and 20 show a pendant formed by this method having a smooth, glossy, scratch-free, clear, semi-pear shaped surface 64 and a plane abraded side surface 65.

Long thin unicrystalline rods of synthetic ruby are frequently shaped by the method of the invention because of their beautiful red color. With such synthetic ruby rods the body T or T'' should be severed from the rod by either entirely thermally severing it, or by thermally forming a very thin neck which can be broken with ease. This is especially important when the ruby rod has a diameter above 0.090 inch because such rods almost invariably fracture when sawed mechanically. Although ruby rods which have been grown in rod form are the most practical and readily available raw material, the method of the invention can be applied to rods cut from larger bodies such as boules or natural rubies. Likewise the method is applicable to types of corundum crystals such as synthetic clear unicrystalline sapphire rods, as well as to crystals of spinel such as magnesia-alumina spinel.

In an example of the invention a burner of the type shown in Figs. 2 and 3 was used with approximately 45 cu. ft./hr. of hydrogen and 17.5 cu. ft./hr. of oxygen, premixed, and flowing through ports of the following sizes in each line of the row 27, reading from left to right in Fig. 2 (port sizes are Manufacturers' Standard Drill Size numbers): 59, 56, 55, 65, 65, 65, 63, 63, 63, 57, 55, 55, 55.

The burner was slowly brought into position about 1.125 inches away from a tapered synthetic ruby rod of 0.130 inch diameter with the row 27 of ports parallel to the rod, and the oxy-hydrogen ribbon flame was applied normally to the rod as it rotated at approximately 75 R. P. M. In about 1.5 minutes from the time the burner reached its operating position, a 6 x 9 mm. teardrop and a thin adjoining neck had formed, and the burner was then slowly withdrawn from its operating position.

In another example of the invention, a single jet oxy-natural gas flame consuming approximately 12.5 cu. ft./hr. of oxygen and 11 cu. ft./hr. of natural gas flowing together through a 0.125 inch inside diameter burner nozzle was applied to the end of a rotating 0.100 inch diameter synthetic ruby rod for approximately 1.25 minutes while maintaining the end of the nozzle 1.25 inches from the rod, and a 0.180 inch diameter ball was formed on the end of the rod. Thereafter, the same flame was shifted and applied radially to form a neck, and the constricting operation was continued until the diameter of the rod at the zone of flame impingement was reduced to approximately 0.025 inch. After cooling, the resulting teardrop enlargement was manually detached at the neck and its pointed base was mechanically ground off to produce a finished cabochon.

The exact mechanism of the process described above is not yet fully understood but the shaping operation is believed to proceed by surface fusion with consequent reshaping of the mass through the effects of surface tension and perhaps flame erosion with, finally, recrystallization.

Specific embodiments of the invention have been described above in detail only by way of illustration. It is to be understood that changes in the specific procedure and apparatus described, and in the resulting products, can be made without in the scope of the invention.

I claim:

1. In a method for making a small rounded body from a thin crystalline rod of material selected from the group consisting of corundum and spinel: forming a bulb on such rod by applying against a portion thereof an intensely hot heating medium, while rotating said rod about its longitudinal axis; and, while rotating said rod about its longitudinal axis, constricting said rod at a zone adjacent the base of said bulb by applying against said rod at said zone an intensely hot heating medium to effect displacement of said material from said zone.

2. In a method according to claim 1, discontinuing said constricting step after the formation of a thin neck, and severing said bulb from said rod at said neck.

3. In a method according to claim 1, continuing said constricting step until said bulb separates from said rod.

4. In a method according to claim 1, during said constricting step displacing material longitudinally of said rod away from said bulb to form a second bulb on said rod.

5. In a method for making a small rounded body from a thin crystalline rod of material selected from the group consisting of corundum and spinel: tapering an end of said rod to a reduced diameter; forming a bulb on the end of such a rod by applying against a zone thereon adjacent to and including said end an intensely hot heating medium, while rotating said rod about its longitudinal axis; and, while rotating said rod about its longitudinal axis, constricting said rod at a zone adjacent the base of said bulb by applying against said rod at said zone an intensely hot heating medium to displace material from said zone.

6. In a method for making a small rounded body from a thin crystalline rod of material selected from the group consisting of corundum and spinel: forming a bulb on the end of such a rod by applying against an end portion thereof an intensely hot heating flame; and constricting said rod adjacent the base of said bulb by applying against a circumferential zone on said rod an intensely hot heating flame to displace material from said zone.

7. A method for making a cabochon from a thin rod of material selected from the group consisting of corundum and spinel comprising forming a bulb on the end of such a rod by applying against an end portion thereof an intensely hot heating flame, while rotating said rod about its longitudinal axis; severing said bulb from said rod, said severing being at least partially accomplished by constricting said rod at a zone adjacent the base of said bulb by rotating said rod and applying thereto at said zone an intensely hot heating flame to displace material from said zone; and abrading material from the base of said severed bulb to form a surface extending transversely thereof.

8. A method for making a pendant from a thin rod of material selected from the group consisting of corundum and spinel comprising forming a bulb on the end of such a rod by applying against an end portion thereof an intensely hot heating flame, while rotating said rod about its longitudinal axis; severing said bulb from said rod, said severing being at least partially accomplished by constricting said rod at a zone adjacent the base of said bulb by rotating said rod and applying thereto at said zone an intensely hot heating flame to displace material from said zone; and abrading material from said severed bulb in a direction longitudinally thereof to form a surface extending in a lengthwise direction.

9. A method for making small rounded bodies from a thin crystalline rod of material selected from the group consisting of corundum and spinel comprising forming a bulb on such a rod by applying against an end portion thereof an intensely hot heating medium, while rotating said rod about its longitudinal axis; severing said bulb from said rod, said severing being at least partially accomplished by constricting said rod at a zone adjacent the base of said bulb to form a thin neck by rotating said rod and applying thereagainst at said zone an intensely hot heating medium to displace the melted material from said zone; and repeating said forming and severing on successive end portions of said rod.

10. In a process for making a small rounded body from a crystalline rod of material selected from the group consisting of corundum and spinel: forming a bulb and an adjoining thin neck by rotating said rod about its longitudinal axis while applying to a zone thereon an intensely hot ribbon flame arranged lengthwise of said rod, said flame comprising a middle section of relatively low heating intensity and two end sections of relatively high heating intensity.

11. In a process for making a small rounded body from a crystalline rod of material selected from the group consisting of corundum and spinel: forming a bulb and an adjoining thin neck by rotating said rod about its longitudinal axis while applying to a zone thereon an intensely hot ribbon flame comprising a row of flame jets arranged lengthwise of said rod, the flame jets in the middle part of said row having relatively small size and heating intensity, the flame jets on both sides of said middle part of said row having relatively larger size and heating intensity.

12. In a process for making a small rounded body from a solid crystalline rod of material selected from the group consisting of corundum and spinel: forming a solid bulb on one end of said rod by applying a flame to a zone on said rod adjacent to and including said end while rotating said rod about its longitudinal axis; and thereafter constricting said rod at a zone adjoining the base of said bulb by applying a flame to said zone to displace material from said zone, while rotating said rod about its longitudinal axis.

THOMAS F. HART.

REFERENCES CITED

The following references are of record in the file of this patent:

UNITED STATES PATENTS

| Number | Name | Date |
| --- | --- | --- |
| 762,183 | Agramonte | June 7, 1904 |
| 1,967,603 | Zimber | July 24, 1934 |
| 2,235,515 | Carpenter | Mar. 18, 1941 |
| 2,405,892 | Lederer et al. | Aug. 13, 1946 |